(12) United States Patent
Newman et al.

(10) Patent No.: US 7,318,855 B2
(45) Date of Patent: Jan. 15, 2008

(54) GAS/LIQUID SEPARATION UTILIZING STRUCTURED SEPARATOR MATERIAL

(75) Inventors: Clyde D. Newman, Oak Park, CA (US); Albert D. Tomassian, West Hills, CA (US); Alan Z. Ullman, Northridge, CA (US); David L. Wait, Westlake Village, CA (US)

(73) Assignee: The Boeing Company, Chicago, IL (US)

( * ) Notice: Subject to any disclaimer, the term of this patent is extended or adjusted under 35 U.S.C. 154(b) by 415 days.

(21) Appl. No.: 11/093,928

(22) Filed: Mar. 30, 2005

(65) Prior Publication Data

US 2006/0219097 A1    Oct. 5, 2006

(51) Int. Cl.
    *B01D 19/00*    (2006.01)
(52) U.S. Cl. ............... 95/262; 55/440; 96/215; 96/202; 372/54
(58) Field of Classification Search ............. 95/262; 96/204, 215, 202; 55/440; 372/89, 55, 90, 372/51, 54
See application file for complete search history.

(56) References Cited

U.S. PATENT DOCUMENTS

| | | | | |
|---|---|---|---|---|
| 3,813,851 A | * | 6/1974 | Eder | 95/260 |
| 5,229,100 A | * | 7/1993 | Harpole | 423/579 |
| 5,624,654 A | * | 4/1997 | Clendening et al. | 423/579 |
| 2004/0011201 A1 | * | 1/2004 | Stevens et al. | 95/262 |

* cited by examiner

*Primary Examiner*—Duane Smith
*Assistant Examiner*—Douglas J. Theisen
(74) *Attorney, Agent, or Firm*—MacPherson Kwok Chen & Heid LLP; David S. Park

(57) ABSTRACT

An apparatus and method for gas/liquid separation on an array of jets or streams of liquid is provided. Layers of structured packing material are configured to "quiet" high-velocity liquid flow with entrained gas to provide a flow at moderate or low velocity from which the gas has been substantially separated from the liquid.

20 Claims, 3 Drawing Sheets

TOP VIEW

SIDE VIEW

GAS/LIQUID SEPARATION UTILIZING STRUCTURED SEPARATOR MATERIAL

CROSS-REFERENCE TO RELATED APPLICATIONS

This application is related to U.S. application Ser. No. 11/093,893, filed Mar. 30, 2005, which is incorporated herein by reference in its entirety.

TECHNICAL FIELD

The present invention relates generally to separators and, more particularly, to gas/liquid separators for chemical lasers.

BACKGROUND

Laser beams are generated by means of a population inversion consisting of an unstable abundance of molecules having excited high energy electronic states which release photons as they decay to the equilibrium lower energy states of the optically active media.

In high energy chemical lasers, the excited electronic states are generated by a chemical reaction. For example, one such reaction involves the use of excited molecular oxygen, hereinafter referred to as singlet delta oxygen (SDO) or $O_2(^1\Delta)$, in combination with an optically active media or lasing substance, such as iodine or fluorine.

One method presently in use for generating a stream of SDO involves a chemical reaction between chlorine gas and a basic solution of hydrogen peroxide, hereinafter referred to as basic hydrogen peroxide (BHP). The excited oxygen can then be added to a suitable lasing medium and the mixture passed through an optical resonator/cavity to bring about a lasing action.

These lasers have been found to be very useful but improved performance characteristics, especially in the area of materials supply and efficiency, is desirable. In particular, a number of problems in the supply, storage, and maintenance of the BHP reactant material has limited the use of these chemical lasers in military and airborne applications.

A high-performance tactical laser weapon requires a laser that operates on a sustained basis, providing rapid fire capability. Many lasers, such as chemical oxygen iodine lasers (COILs) (e.g., the Advanced Tactical Laser (ATL) Advanced Component Technology Demonstration (ACTD)), can operate only in a short lasing burst limited by the supply of BHP. Each burst is separated by a longer time period during which spent and excess BHP is recycled to support another lasing burst. This limits the utility of laser weapons and hence their potential.

In the ATL, the BHP is reacted as finely divided high-velocity jets with a low pressure chlorine stream. For tactical laser applications on a C130 aircraft or smaller platform, the use of conventional art such as centrifugal separators is not practical. Current technology to provide continuous BHP circulation and lasing requires large volumes for separation (i.e., low displacement velocities for demister/coalescer devices), or the expenditure of energy which is not available in the fluid stream without either reboost of pressure or the use of fluid head (i.e., centrifugal separators), and/or equipment arrangement that exceeds the limits of space in tactical laser platforms.

The flow conditions at the location on the COIL device at which the BHP jets or droplets exit present conditions that are far outside of the conditions encountered in typical industrial phase separations, including distillation and gas/liquid separation or demisting. In comparison to distillation, the average liquid loading for laser usage is approximately 100 times that typically encountered, and peak locations have loadings of 1,000 times or higher than typically encountered in industrial applications. The liquid-to-gas weight ratio is also unusually high, running upwards of 10,000 compared to normal industrial distillation conditions of 10 or less. In industrial demisting applications, the liquid-to-gas weight ratio is even lower, typically 0.1 or lower.

Thus, no industrial technology is known that meets the flow control and gas/liquid separation requirements for laser applications with the constraints of a tactical platform. Accordingly, an apparatus and method for gas/liquid separation for laser applications adaptable to relatively smaller and flatter platforms is highly desirable.

SUMMARY

The present invention provides a novel approach to gas/liquid separation that avoids the use of a centrifugal separator or a large mist eliminator/coalescer and provides a more compact separation capability for lasers, such as COILs.

In accordance with an embodiment of the present invention, a gas/liquid separator is provided, the separator including a housing, and a first layer of corrugations forming inclined channels, the first layer of corrugations to receive a liquid and a gas to be separated.

In accordance with another embodiment of the present invention, a generator for a chemical laser is provided, the generator including a first layer of corrugations forming steeply inclined channels, the first layer of corrugations to receive a liquid and a gas to be separated; a second layer of corrugations adjacent the first layer of corrugations, the second layer of corrugations forming channels more obliquely inclined than the first layer of corrugations, the second layer of corrugations to receive at least a portion of the liquid and the gas from the first layer of corrugations; and a third layer of corrugations adjacent the second layer of corrugations, the third layer of corrugations forming channels having a shorter separation distance than the second layer of corrugations, the third layer of corrugations to receive at least a portion of the liquid and the gas from the second layer of corrugations. The generator further includes an injector plate that provides the liquid to the first layer of corrugations, wherein the injector plate is configured to provide the liquid at an irrigation rate of up to about 1,100 gpm/ft$^2$, and a gas injector that provides the gas to be mixed with the liquid, the liquid and the gas being provided at the entrance to the gas/liquid separator at a liquid-to-gas ratio up to about 50,000:1 (weight/weight).

In accordance with yet another embodiment of the present invention, a method for gas/liquid separation is provided, the method including providing a first layer of corrugations forming inclined channels; and flowing a mixture of liquid and gas through the first layer of corrugations, thereby substantially separating the liquid from the gas.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
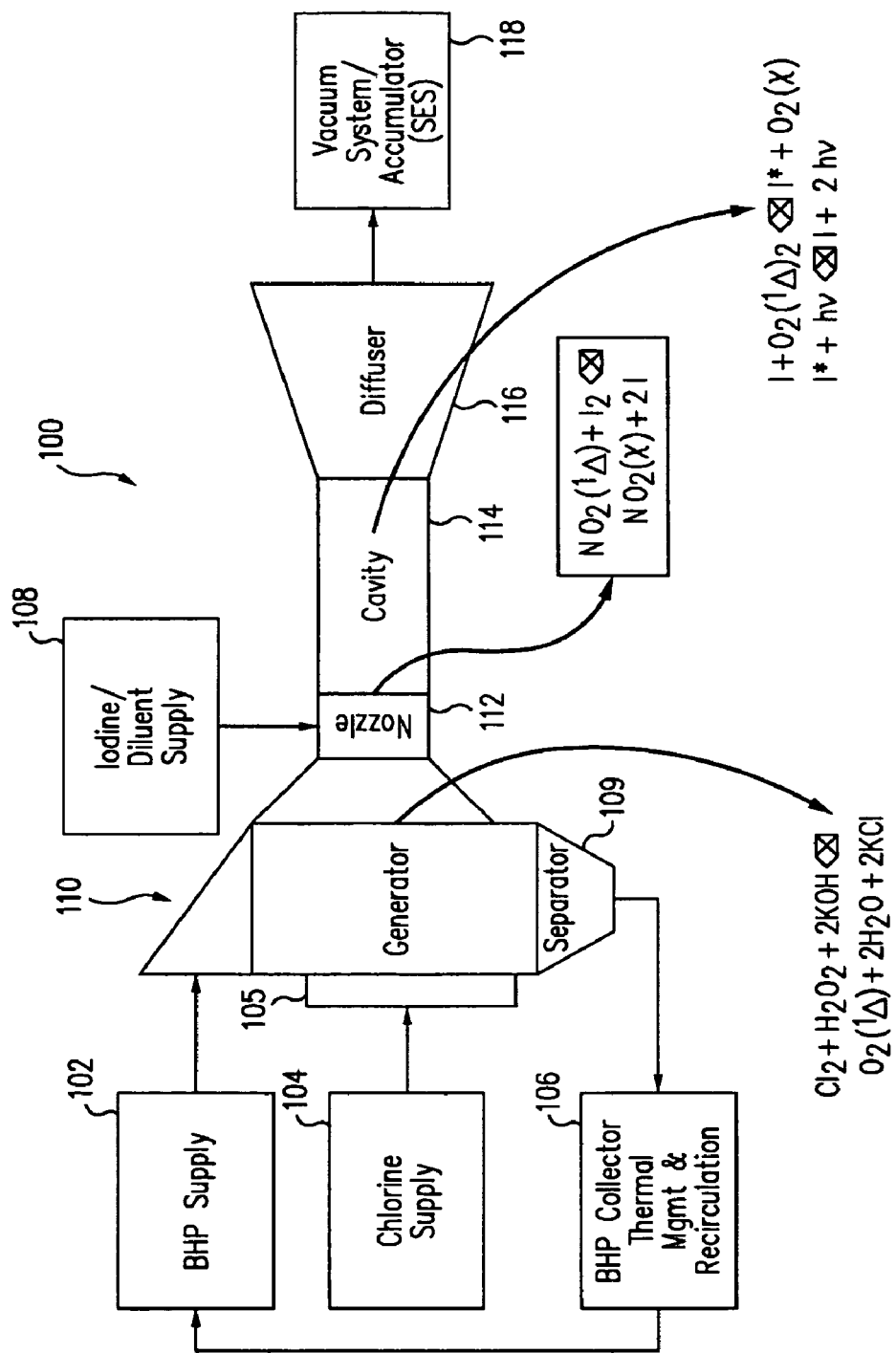
FIG. 1 shows a block diagram illustrating a laser system including a gas/liquid separator in accordance with an embodiment of the present invention.

Embodiments of the present invention and their advantages are best understood by referring to the detailed description that follows. It should be appreciated that like reference numerals are used to identify like elements illustrated in one or more of the figures. It should also be appreciated that the figures may not be necessarily drawn to scale.

DETAILED DESCRIPTION

FIG. 1 shows a block diagram illustrating a laser system 100 in accordance with an embodiment of the present invention. In one example, system 100 may be a chemical oxygen-iodine laser (COIL). System 100 includes a singlet delta oxygen (SDO or $O_2(^1\Delta)$) generator 110 operably coupled to a basic hydrogen peroxide (BHP) supply 102 and a chlorine supply 104. An outlet of generator 110 is operably coupled to a supersonic nozzle 112, which is also operably coupled to an iodine supply 108. A laser cavity 114 is operably coupled to an outlet of nozzle 112, and a diffuser 116 is operably coupled to an outlet of cavity 114. Finally a sealed exhaust system 118, providing vacuum and accumulation of exhaust gases, is operably coupled to an outlet of diffuser 116.

A gas/liquid separator 109 is operably coupled to generator 110 to separate spent and excess liquid reactants and products (i.e., spent and excess BHP and salts) from gas reactants and products. It is noted that gas/liquid separator 109 may be integral to generator 110 in one embodiment or a separate module in another embodiment. A BHP collector 106, which collects the separated liquid phase from gas/liquid separator 109, is coupled to gas/liquid separator 109. In other embodiments, BHP collector 106 may further treat the separated liquid reactants and BHP (e.g., heat treatment via a heat exchanger). From either gas/liquid separator 109 or BHP collector 106, the separated BHP is then recirculated to BHP supply 102 for further use in the generation of SDO.

In one example, BHP supply 102 provides an aqueous mixture of hydrogen peroxide and a base. The base component may be selected from alkaline bases including but not limited to potassium hydroxide (KOH), sodium hydroxide (NaOH), and lithium hydroxide (LiOH), but KOH provides advantages such as low temperature and high concentration. In a further example, BHP can refer to an aqueous mixture of about 70 wt % hydrogen peroxide and about 45 wt % KOH. The BHP is used at low temperature, in one example between about −20° F. and about 0° F.

Chlorine supply 104 provides chlorine gas and, optionally, an inert gas such as argon, nitrogen, or helium, is injected into the reaction chamber of generator 110 via a gas injector 105 to allow high total pressure operation of the device.

With the use of KOH in one example, the BHP and chlorine reactants undergo a reaction in generator 110 to generate SDO following the equation below.

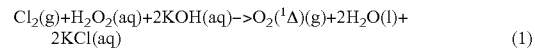

$$Cl_2(g)+H_2O_2(aq)+2KOH(aq) \to O_2(^1\Delta)(g)+2H_2O(l)+2KCl(aq) \quad (1)$$

Generator 110 produces the SDO energy carrier through a reaction of an aqueous mixture of hydrogen peroxide and potassium hydroxide (in this example the BHP), with gas-phase chlorine. Byproducts of this reaction are a salt (in this case potassium chloride), water, and heat. The two-phase reaction shown in equation (1) is very exothermic, releasing most of the energy as heat into the BHP solution (110 kJ/mol) and maintaining the rest in an electronically excited state of oxygen called singlet delta oxygen.

The apparatus and method of the present invention may provide substantially continuous production of SDO by providing a substantially continuous flow of the BHP and chlorine reactants in accordance with an embodiment of the present invention. In one embodiment, a separator includes one or more layers of corrugations forming inclined channels, the first layer of corrugations to receive a liquid and a gas to be separated. Optionally, subsequent layers of corrugations may be provided adjacent to or separated from the first layer of corrugations. The layers of corrugations include features tailored to the functions of momentum shedding, spreading of the flow, and gas/liquid disengagement. The tailoring features may include, but are not limited to, inclination of corrugations, scale, and shape.

The present invention provides a means of performing gas/liquid separation on an array of jets or streams of liquid such that high-velocity liquid flow with entrained gas is "quieted" to provide a flow at moderate or low velocity from which the gas has been sufficiently separated from the liquid to permit eventual reboost to BHP supply pressure by use of a pump.

As noted above, the present invention operates under conditions of velocity (local and average) and liquid-to-gas weight ratios that are outside of the normal range of conditions under which commercial gas/liquid systems, such as distillation columns, separators, and demisters, operate. For example, in comparison to distillation, the average liquid loading for laser usage is approximately 100 times that typically encountered, and peak locations have loadings of 1,000 times or higher than typically encountered in industrial applications. Liquid-to-gas weight ratio is up to about 50,000:1 (weight/weight) compared to typical industrial distillation conditions of 10 or less. In industrial demisting applications, the liquid-to-gas weight ratio is even lower, being typically 0.1 or lower.

In accordance with an embodiment of the present invention, a gas/liquid separator is effective for liquid irrigation rates up to about 1,100 gpm/ft$^2$, and preferably between about 200 gpm/ft$^2$ and about 1,100 gpm/ft$^2$, and inlet liquid-to-gas weight ratios up to about 50,000:1 (weight/weight).

Figure 2:
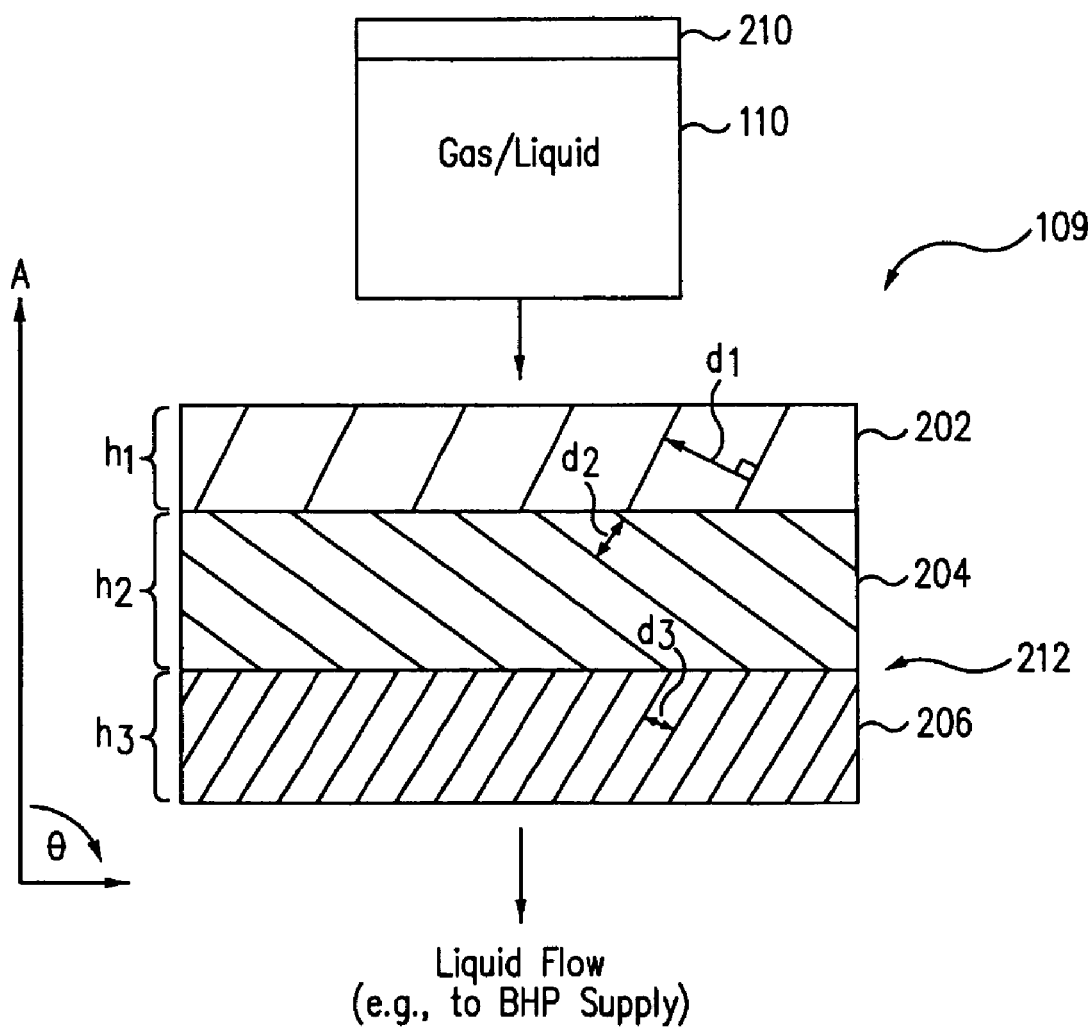
FIG. 2 shows a diagram illustrating a cross-section of a gas/liquid separation apparatus in accordance with an embodiment of the present invention.
Figure 3A:
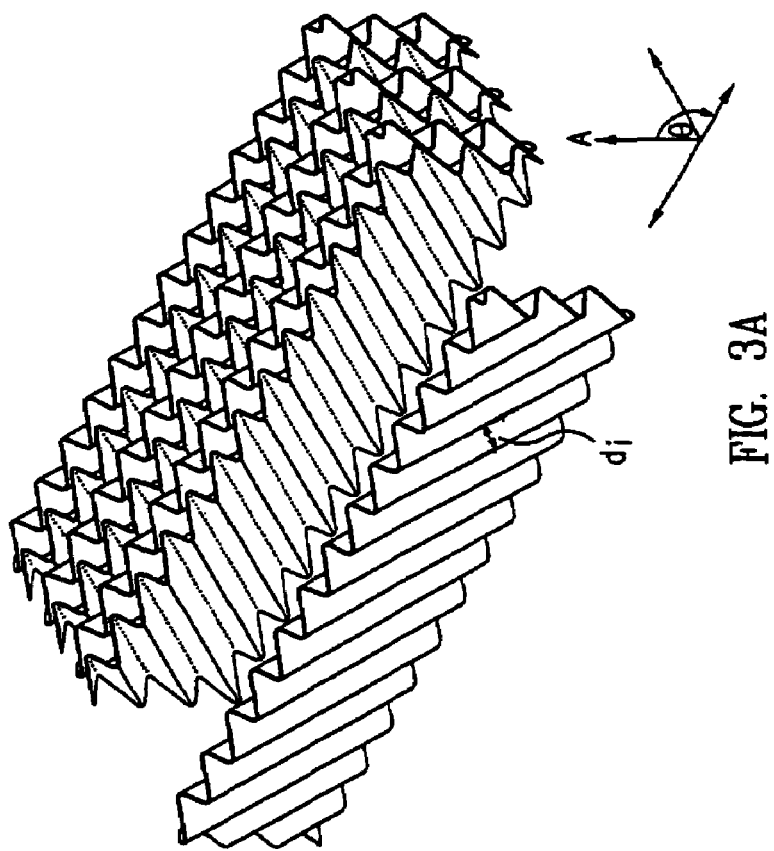
FIGS. 3A, 3B, and 3C illustrate a perspective view, a top view, and a side view of structured separator material in the gas/liquid separation apparatus of FIG. 2 in accordance with an embodiment of the present invention.
Figure 3B:
Figure 3C:
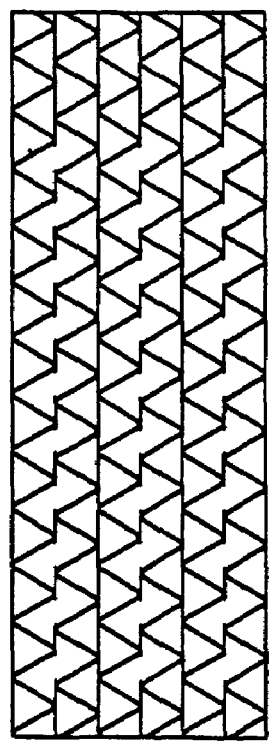
Figure 3C:
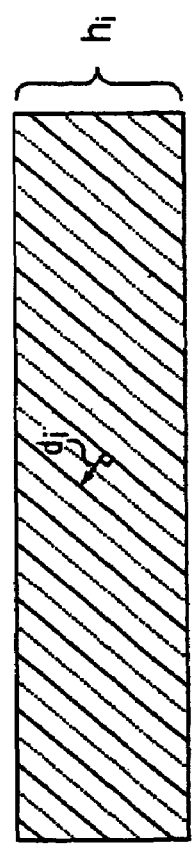

Referring now to FIG. 2 in conjunction with FIGS. 3A, 3B, and 3C, a gas/liquid separator 109 is illustrated in accordance with an embodiment of the present invention. FIGS. 3A, 3B, and 3C illustrate a perspective view, a top view, and a side view of structured separator material in the gas/liquid separation apparatus of FIG. 2 in accordance with an embodiment of the present invention.

In one example, separator 109 receives liquid and entrained gas from a generator 110 for separation by multiple layers of structured packing material. In other embodiments, a single layer of structured packing material may be used for the liquid/gas separation. An injector plate 210 of generator 110 may be configured to provide a liquid irrigation rate between about 200 gpm/ft$^2$ and about 1,100 gpm/ft$^2$, and generator 110 may provide liquid and gas at a liquid-to-gas ratio up to about 50,000:1 (weight/weight). It is noted that injector plate 210 may be an integral part of generator 110 when separator 109 is integral to generator 110.

Gas/liquid separator 109 includes a plurality of layers of structured packing materials 202, 204, and 206 within a housing 212, with each layer oriented and sized to allow efficient introduction of the liquid streams. The packing materials are selected and sized to perform the quieting of the gas/liquid flow rapidly and with minimum or reduced height so as to meet the overall needs of the tactical laser weapon.

The present invention performs the desired gas/liquid separation and flow quieting under conditions meeting the requirements of a COIL device by using structured packing material, for example material similar to that used in distillation columns, particularly those used for vacuum distillation. Examples of applicable structured packing material include, but are not limited to, Flexipac® available from Koch-Glitsch, LP of Wichita, Kans., Mellapak® available from Sulzer Chemtech USA, Inc. of Pasadena, Tex., and Montz-Pak packing available from Julius Montz GmbH of Hilden, Germany. However, the application and the combination of the dimensional scales and orientations are unique to the present invention.

In one embodiment, the packing materials include a corrugated metal, plastic, or ceramic structure. The metal may be selected from the group consisting of steel, aluminum, copper, titanium, tantalum, brass, nickel, and alloys thereof.

The corrugations are composed of a series of sheets oriented to provide a "criss-cross" of flow passages or channels. The angle of inclination of the corrugations of adjacent sheets is alternated with respect to a vertical axis "A" of the separator (see FIGS. 2 and 3A). Perforations and surface texturing, including waffled, grooved, and smooth, further promote gas flow and distribution/spreading over the cross-section of the separator packing.

The corrugations have surfaces configured and oriented such as to perform one or more of seven important steps for the gas/liquid separation process: (1) intercepting the intense jets of gas/liquid flow with minimal "splash-back"; (2) reducing the momentum of the jets; (3) spreading the flow so as to reduce the average velocity of the gas/liquid flow; (4) separating the liquid and gases; (5) coalescing the liquid jets into a homogeneous mass without trapping gas in the liquid; (6) expelling the gas from the liquid without causing entrainment of liquid in the gas stream; and (7) incorporating the coalesced jets into a liquid outlet stream without further entrainment of gas.

The materials used typically have a complex structure of corrugated sheets and are stacked such that corrugations of a sheet are at an angle to corrugations of adjacent sheets in an alternating pattern (see FIGS. 2 and 3A). The sheets and layers form channels that spread the flow and allow the liquid to pass through. The sheets may have both gas passages (vent holes) and a ribbed surface to increase the rate of momentum loss. Experimentation has shown that the finer the scale of the corrugations the more rapidly the liquid is slowed and the gas separated from the liquid, but also the lower the limiting flow rate of liquid and gas before the flow backs up in the separator.

In one example, the separator material is characterized by a separation distance "$d_i$" (see FIGS. 3A and 3C), an angle of inclination relative to vertical axis "A" (see FIGS. 2 and 3A), and a layer thickness "$h_i$" (see FIG. 3C). Separation distance $d_i$ is the distance of a perpendicular line between two parallel "peak" lines (shown by solid lines in FIGS. 3A and 3C) or two parallel "valley" lines (shown by dotted lines in FIGS. 3A and 3C) of the corrugated material. It is noted that dotted lines representing valleys of the corrugated material have not been included in FIG. 2 for the sake of clarity.

Accordingly, in one embodiment of the present invention, the layer structure is configured so that a first or top layer 202 generally has the largest dimensional scale, and therefore is able to receive and shed the momentum of the high-velocity jets and gas. In one example, top layer 202 includes material having large-scale corrugations to accommodate high velocities, and the large-scale corrugations are at a steep angle (i.e., a small angle of inclination relative to vertical axis "A") to minimize splash-back. In one example, the corrugations include 90-degree folds producing a layup of alternating corrugated sections with a separation distance "$d_1$" between about ½ inch and about 1 inch, and have an angle of inclination between about 30 degrees and about 45 degrees relative to vertical axis "A". A thickness "$h_1$" of top layer 202 is controlled to achieve a desired level of momentum shedding, and in one example, has a thickness $h_1$ between about 2 inches and about 6 inches.

A second or middle layer 204 manages the slowed and partially degassed jets, and is arranged to rapidly spread the liquid over a larger surface area. In one example, middle layer 204 includes material having highly inclined corrugations to spread flow rapidly. In one example, the corrugations have a separation distance "$d_2$" between about ½ inch and about 1 inch, and have an angle of inclination between about 45 degrees and about 60 degrees relative to vertical axis "A", and preferably have an angle of inclination of about 60 degrees relative to vertical axis "A". A thickness "$h_2$" of middle layer 204 is controlled to achieve a desired level of momentum shedding, and in one example, has a thickness $h_2$ between about 2 inches and about 4 inches.

A third or bottom layer 206 is comprised of material with fine scale corrugations which can receive the lower specific flow rate while substantially separating the gas and producing steady flow of liquid. Bottom layer 206 includes material having small-scale corrugations to complete degassing and quieting of the flow. In one example, the corrugations have a separation distance "$d_3$" between about ½ inch and about 1 inch, and have an angle of inclination between about 30 degrees and about 60 degrees relative to vertical axis "A", and preferably have an angle of inclination of about 45 degrees relative to vertical axis "A". In a further example, bottom layer 206 is controlled to achieve a desired level of gas/liquid disengagement and has a thickness "$h_3$" between about 2 inches and about 6 inches.

The layer thicknesses should be kept sufficiently short such that the flow does not back up into the upstream equipment. The layer thicknesses should be kept sufficiently long such that the desired degree of gas/liquid separation is attained.

Embodiments described above illustrate but do not limit the invention. It should also be understood that numerous modifications and variations are possible in accordance with the principles of the present invention. For example, more or less layers of structured packing material than the three shown and described above is within the scope of the present invention. Accordingly, the scope of the invention is defined only by the following claims.

We claim:

1. A gas/liquid separator for chemical lasers, comprising:
   a housing;
   a first layer of corrugations forming inclined channels, the first layer of corrugations to receive a liquid and a gas to be separated; and
   a second layer of corrugations adjacent the first layer of corrugations, the second layer of corrugations forming channels of different inclination and separation distance than the first layer of corrugations, the second layer of corrugations to receive at least a portion of the liquid and the gas from the first layer of corrugations.

2. The separator of claim 1, wherein the first layer of corrugations has a thickness between about 2 inches and about 6 inches, and includes channels having a separation distance between about ½ inch and about 1 inch and an angle of inclination between about 30 degrees and about 45 degrees with a vertical axis.

3. The separator of claim 1, wherein the first layer of corrugations is configured to receive basic hydrogen peroxide.

4. The separator of claim 1, wherein the first layer is comprised of material selected from the group consisting of metal, plastic, and ceramic.

5. The separator of claim 1, wherein the first layer is comprised of material selected from the group consisting of steel, aluminum, copper, titanium, tantalum, brass, nickel, and alloys thereof.

6. The separator of claim 1, wherein the first layer of corrugations is configured to receive the liquid and the gas at a liquid-to-gas ratio up to about 50,000:1 (weight/weight).

7. The separator of claim 1, wherein the first layer of corrugations receives the liquid from an injector plate.

8. The separator of claim 7, wherein the first layer of corrugations receives the liquid from the injector plate at an irrigation rate between about 200 gpm/ft$^2$ and about 1,100 gpm/ft$^2$.

9. The separator of claim 1, further comprising a second layer of corrugations adjacent the first layer of corrugations, the second layer of corrugations forming channels more inclined than the first layer of corrugations.

10. The separator of claim 1, wherein the second layer of corrugations has a thickness between about 2 inches and about 4 inches and includes channels having a separation distance between about ½ inch and about 1 inch and an angle of inclination between about 45 degrees and about 60 degrees.

11. The separator of claim 1, further comprising a third layer of corrugations adjacent the second layer of corrugations, the third layer of corrugations forming channels having a shorter separation distance than the second layer of corrugations, the third layer of corrugations to receive at least a portion of the liquid and the gas from the second layer of corrugations.

12. The separator of claim 11, wherein the third layer of corrugations has a thickness between about 2 inches and about 6 inches and includes channels having a separation distance between about ½ inch and about 1 inch and an angle of inclination between about 30 degrees and about 60 degrees.

13. A generator for chemical lasers, comprising:
    a first layer of corrugations forming steeply inclined channels, the first layer of corrugations to receive a liquid and a gas to be separated;
    a second layer of corrugations adjacent the first layer of corrugations, the second layer of corrugations forming channels more obliquely inclined than the first layer of corrugations, the second layer of corrugations to receive at least a portion of the liquid and the gas from the first layer of corrugations;
    a third layer of corrugations adjacent the second layer of corrugations, the third layer of corrugations forming channels having a shorter separation distance than the second layer of corrugations, the third layer of corrugations to receive at least a portion of the liquid and the gas from the second layer of corrugations;
    an injector plate that provides the liquid to the first layer of corrugations, wherein the injector plate is configured to provide the liquid at an irrigation rate of up to about 1,100 gpm/ft$^2$; and
    a gas injector that provides the gas to be mixed with the liquid, the liquid and the gas being provided at a liquid-to-gas ratio up to about 50,000:1 (weight/weight).

14. The generator of claim 13, wherein the first layer of corrugations include channels having a separation distance between about ½ inch and about 1 inch and an angle of inclination between about 30 degrees and about 45 degrees.

15. The generator of claim 13, wherein the second layer of corrugations include channels having a separation distance between about ½ inch and about 1 inch and an angle of inclination between about 45 degrees and about 60 degrees.

16. The generator of claim 13, wherein the third layer of corrugations include channels having a separation distance between about ½ inch and about 1 inch and an angle of inclination between about 30 degrees and about 60 degrees.

17. A method of gas/liquid separation, comprising:
    providing a first layer of corrugations forming inclined channels;
    providing a second layer of corrugations adjacent the first layer of corrugations, the second layer of corrugations forming channels of different inclination and separation distance than the first layer of corrugations; and
    flowing a mixture of liquid and gas through the first and second layers of corrugations, thereby substantially separating the liquid from the gas.

18. The method of claim 17, wherein the mixture of liquid and gas are flowed to the first layer of corrugations at a liquid loading between about 200 gpm/ft$^2$ and about 1,100 gpm/ft$^2$.

19. The method of claim 17, wherein the mixture of liquid and gas are flowed to the first layer of corrugations at a liquid-to-gas ratio up to about 50,000:1 (weight/weight).

20. The method of claim 17, further comprising:
    providing a second layer of corrugations adjacent the first layer of corrugations, the second layer of corrugations forming channels more inclined than the first layer of corrugations;
    providing a third layer of corrugations adjacent the second layer of corrugations, the third layer of corrugations forming channels having a shorter separation distance than the second layer of corrugations; and
    flowing at least a portion of the mixture of liquid and gas through the third layer of corrugations, thereby substantially separating the liquid from the gas.

* * * * *